United States Patent
Rockstroh

(10) Patent No.: US 11,135,653 B2
(45) Date of Patent: Oct. 5, 2021

(54) DMLM BUILD RELEASE LAYER AND METHOD OF USE THEREOF

(71) Applicant: GENERAL ELECTRIC COMPANY, Schenectady, NY (US)

(72) Inventor: Todd Jay Rockstroh, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 945 days.

(21) Appl. No.: 15/643,312

(22) Filed: Jul. 6, 2017

(65) Prior Publication Data

US 2019/0009332 A1 Jan. 10, 2019

(51) Int. Cl.
*B22F 10/20* (2021.01)
*B33Y 10/00* (2015.01)
(Continued)

(52) U.S. Cl.
CPC ............ *B22F 12/00* (2021.01); *B29C 64/245* (2017.08); *B33Y 10/00* (2014.12); *B33Y 30/00* (2014.12); *B33Y 40/00* (2014.12); *C25D 5/34* (2013.01); *C25F 5/00* (2013.01); *B22F 10/10* (2021.01); *B33Y 70/00* (2014.12)

(58) Field of Classification Search
None
See application file for complete search history.

(56) References Cited

U.S. PATENT DOCUMENTS

| 5,503,785 A | 4/1996 | Crump et al. |
| 5,753,274 A | 5/1998 | Wilkening et al. |

(Continued)

FOREIGN PATENT DOCUMENTS

| DE | 10 2007 047 326 A1 | 4/2009 |
| EP | 0 734 842 A1 | 10/1996 |

(Continued)

OTHER PUBLICATIONS

Birk, James P. "Copper, Cu2+." CHM-115 General Chemistry with Qualitative Analysis, Feb. 9, 2002, web.archive.org/web/20020209173705/www.public.asu.edu/~jpbirk/qual/qualanal/copper.html. (Year: 2002).*

(Continued)

*Primary Examiner* — Anthony M Liang
(74) *Attorney, Agent, or Firm* — Dority & Manning, P.A.

(57) ABSTRACT

A method for additive manufacturing utilizing a build plate with a release layer is provided. The method includes irradiating a first layer of powder in a powder bed to form a first fused region over a support. The first release layer is provided between the first fused region and the support. The method also includes providing a given layer of powder over the powder bed and irradiating the given layer of powder in the powder bed to form a given fused region. Providing the given layer of powder over the powder bed and irradiating the given layer of powder in the powder bed to form a given fused region are repeated until the object is formed in the powder bed. The object may be formed fusing individual layers with irradiation by laser or ebeam, or by binder jetting. The method further includes separating the object from the support by melting or dissolving the first release layer.

12 Claims, 7 Drawing Sheets

(51) Int. Cl.
  *B33Y 40/00* (2020.01)
  *C25D 5/34* (2006.01)
  *C25F 5/00* (2006.01)
  *B22F 12/00* (2021.01)
  *B33Y 30/00* (2015.01)
  *B29C 64/245* (2017.01)
  *B22F 10/10* (2021.01)
  *B33Y 70/00* (2020.01)

(56) References Cited

U.S. PATENT DOCUMENTS

| | | |
|---|---|---|
| 8,609,204 B2 | 12/2013 | Kritchman |
| 9,211,678 B2 | 12/2015 | Desimone et al. |
| 2012/0018115 A1 | 1/2012 | Hövel et al. |
| 2016/0325493 A1 | 11/2016 | Desimone et al. |
| 2016/0332386 A1 | 11/2016 | Kuijpers |
| 2017/0028618 A1 | 2/2017 | Robeson et al. |
| 2017/0028651 A1 | 2/2017 | Versluys et al. |
| 2017/0056970 A1 | 3/2017 | Chin et al. |

FOREIGN PATENT DOCUMENTS

| | | |
|---|---|---|
| EP | 3167981 A1 | 5/2017 |
| JP | H04168036 A | 6/1992 |
| JP | H07125080 A | 5/1995 |
| JP | H08281807 A | 10/1996 |
| JP | 2016/198929 A | 12/2016 |

OTHER PUBLICATIONS

"Electroplated and Related Finishes." Guide to the Selection and Use of Electroplated and Related Finishes, by F. Lowenheim, ASTM International, 1982, p. 44. (Year: 1982).*

Munsch, M. Laser Additive Manufacturing: Materials, Design, Technologies, and Applications, edited by Milan Brandt, Woodhead Publishing, 2016, pp. 399-400. (Year: 2016).*

European Search Report Corresponding to Application No. 18181338 dated Nov. 7, 2018.

Machine Translated Japanese Search Report Corresponding to Application No. 2018128741 dated Nov. 5, 2019.

* cited by examiner

DMLM BUILD RELEASE LAYER AND METHOD OF USE THEREOF

INTRODUCTION

The present disclosure generally relates to methods and apparatuses for additive manufacturing utilizing a build plate with a release layer, and methods of manufacturing objects using this apparatus.

BACKGROUND

Additive manufacturing (AM) or additive printing processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses electromagnetic radiation such as a laser beam, to melt or sinter a powdered material, creating a solid three-dimensional object.

An example of an apparatus for AM using a powdered build material is shown in FIG. 1. The apparatus 140 builds objects or portions of objects, for example, the object 152, in a layer-by-layer manner by sintering or melting a powder material (not shown) using an energy beam 170 generated by a source 150, which can be, for example, a laser for producing a laser beam, or a filament that emits electrons when a current flows through it. The powder to be melted by the energy beam is supplied by reservoir 156 and spread evenly over a powder bed 142 using a recoater arm 146 travelling in direction 164 to maintain the powder at a level 148 and remove excess powder material extending above the powder level 148 to waste container 158. The energy beam 170 sinters or melts a cross sectional layer of the object being built under control of an irradiation emission directing device, such as a laser galvo scanner 162. Other techniques for fusing powder may include binder jetting or e-beam irradiation. The galvo scanner 162 may comprise, for example, a plurality of movable mirrors or scanning lenses. The speed at which the energy beam is scanned is a critical controllable process parameter, impacting the quantity of energy delivered to a particular spot. Typical energy beam scan speeds are on the order of 10 to 1000 millimeters per second. The build platform 144 is lowered and another layer of powder is spread over the powder bed and object being built, followed by successive melting/sintering of the powder by the laser 150. The powder layer is typically, for example, 10 to 100 microns in thickness. The process is repeated until the object 152 is completely built up from the melted/sintered powder material. The energy beam 170 may be controlled by a computer system including a processor and a memory (not shown). The computer system may determine a scan pattern for each layer and control energy beam 170 to irradiate the powder material according to the scan pattern. After fabrication of the object 152 is complete, various post-processing procedures may be applied to the object 152. Post-processing procedures include removal of excess powder by, for example, blowing or vacuuming. Other post processing procedures include a stress relief heat treat process. Additionally, thermal and chemical post processing procedures can be used to finish the object 152.

Commercially available AM machines utilize build plates that generally require machining off the built part after the AM build is completed. There exists a need for systems allowing release of the built object from the build plate without the need for machining while providing a build surface that retains the mechanical features of the build plate. As shown in FIG. 2, EP 0 734 842B2 utilizes a prefabricated substrate 13 formed from a stable plate and releaseably secured on the top of the support 2 by bolts 14. The prefabricated substrate 13 is formed from a material to which the object being built 50 adheres upon sintering. This kind of apparatus requires a step of mechanically separating the prefabricated substrate 13 from the object being built 50 using laser cutting or similar means. Another approach described in DE 102007047326A1 includes using flexible film as the support.

There remains a need for a sturdy build surface on a support plate that allows for rapid and non-destructive release of the additively manufactured product on the build surface.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

The foregoing and/or other aspects of the present invention may be achieved by a method of fabricating an object. In one aspect, the method includes (a) depositing a given layer of powder over a support plate in a powder bed, the support plate having a release layer; (b) fusing the given layer of powder in the powder bed to form a given fused region; (c) depositing a subsequent layer of powder; and (d) repeating steps (b) and (c) until the object is formed in the powder bed. The method further includes (e) separating the object from the support by melting or dissolving the release layer.

The foregoing and/or aspects of the present invention may also be achieved by an apparatus for additive manufacturing an object. In one aspect, the apparatus includes a powder dispenser, a removable support having a release layer, and an irradiation source or binder jet for fusing powder into the object. Other features and aspects may be apparent from the following detailed description, the drawings, and the claims.

Other features and aspects may be apparent from the following detailed description, the drawings, and the claims.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present application is directed to methods and apparatuses for additive manufacturing utilizing a build plate with a release layer, and methods of manufacturing objects using this apparatus.

Figure 1:
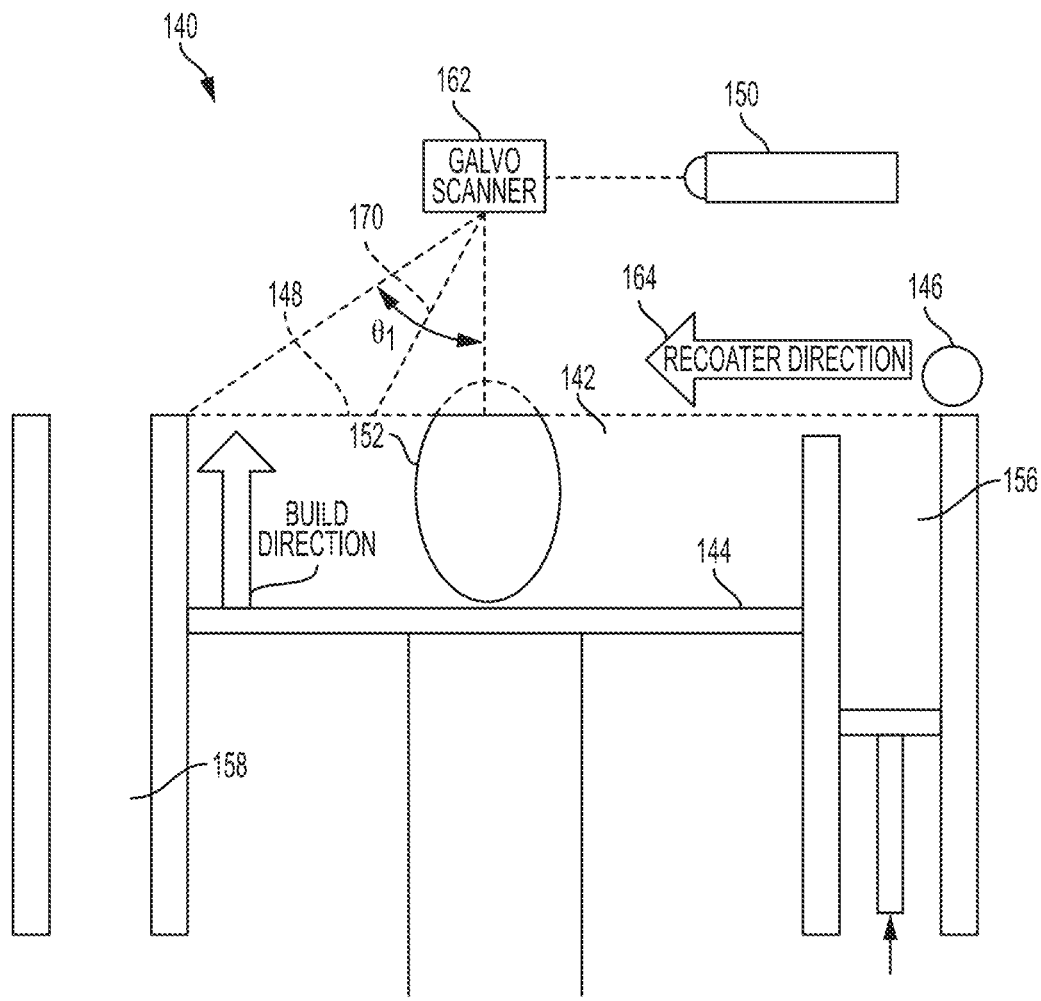
FIG. 1 is a diagram of an apparatus for AM according to conventional methods.
Figure 2:
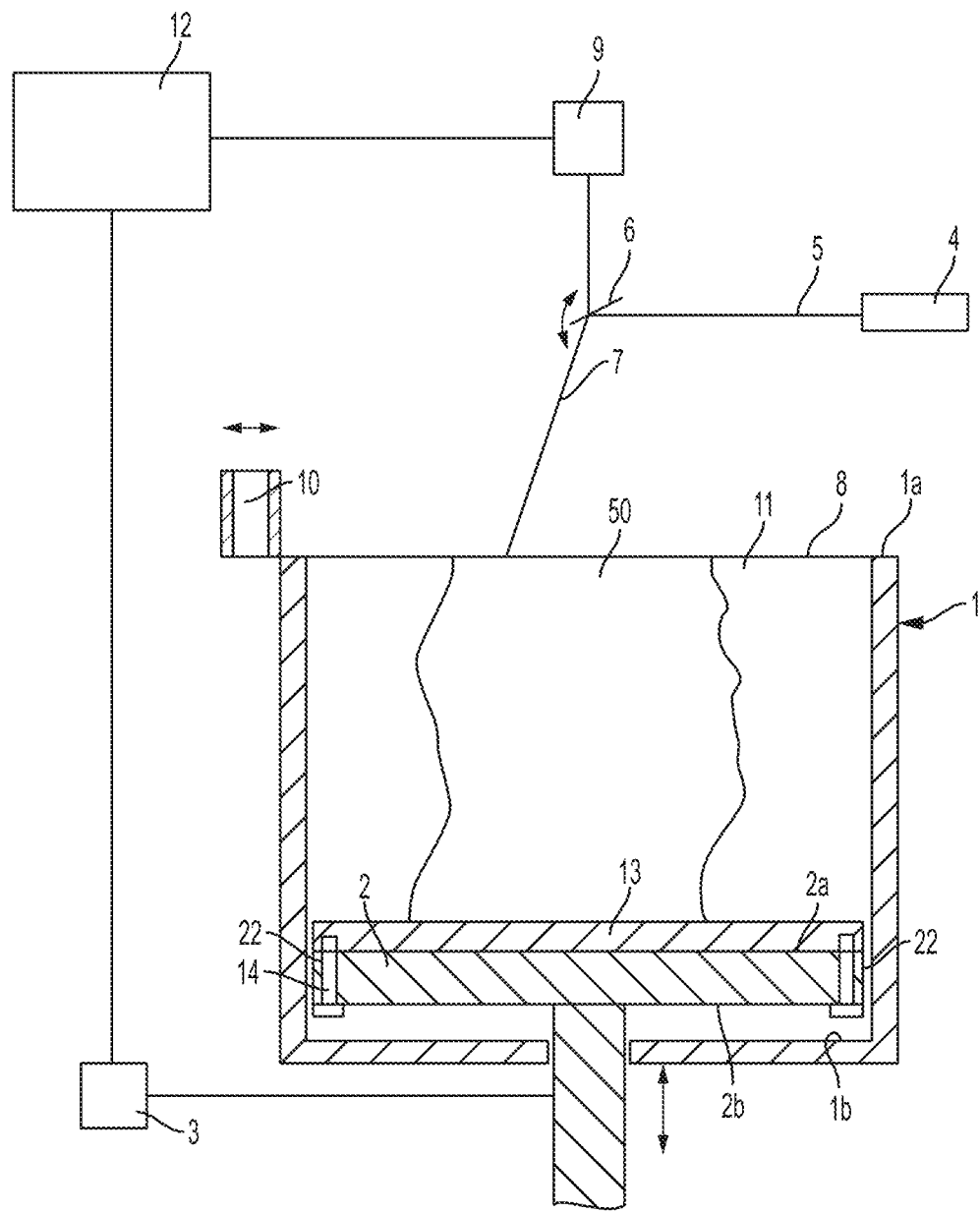
FIG. 2 is a diagram of a conventional AM apparatus having a releaseable prefabricated substrate upon which an object is built.
Figure 3A:
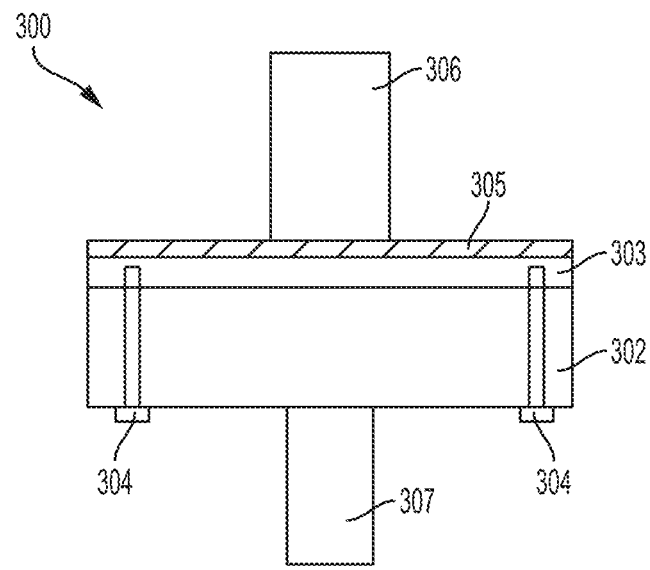
FIGS. 3A-C are diagrams illustrating a process of releasing an AM built object from a support plate, according to an embodiment of the present invention.

FIG. 3A shows a cross-sectional side view of a portion of an AM apparatus 300, according to an example embodiment of the present invention. It will be understood that other portions of the powder bed apparatus such as the build chamber, recoater arm, and laser galvo, e-beam, or binder jet are not shown. The AM apparatus 300 includes a support base 302 to support an object 306 to be built thereon within the powder bed. The support base 302 may be controlled by a control unit (not shown) to move the support base 302. For example, the control unit may adjust the support base 302 to lower or raise the support base 302 during a building process of the object 306. A removable support plate 303 may be provided to attach to an upper side of the support base 302 and can be adjusted together with the support base 302. The removable support plate 303 may be configured, for example, to have a width that corresponds to a width of the support base 302. That is, the removable support plate 303 may extend along the support base 302 such that the removable support plate 303 extends parallel to the upper side of the support base 302. The support base 302 may be configured with bolts 304 to attach a bottom side of the removable support plate 303 to the support base 302.

A release layer 305 positioned on the upper side of the removable support plate 303 is provided to cover at least a portion of the removable support plate 303 upon which the object 306 is built. The release layer 305 may be a removable interface made of a copper or copper alloy material. To facilitate the separating, the release layer 305 should be a different material than that of the object 306 and the removable support plate 303. For example, the release layer 305 may be made of copper or a copper alloy while the object and support are made with a different material than the release layer, such as cobalt chrome or steel. The material of the release layer should have different melting, dissolution, or electrolysis properties from that of the support and object to be built.

Figure 3B:
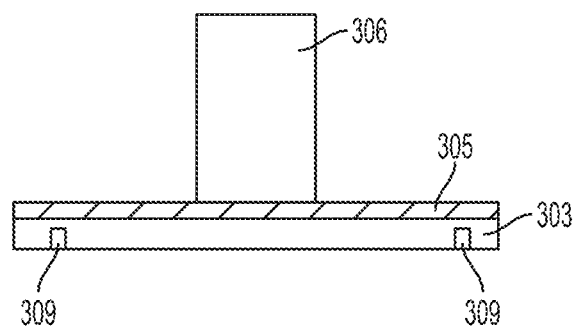

FIG. 3B shows a cross-sectional view of the release layer 305 and removable support plate 303, according to an example embodiment. As shown in FIG. 3B, the object 306 is positioned on the release layer 305 when building the object 306 in the powder bed. The bottom side of the removable support plate 303 is illustrated with receiving portions 309 to receive the bolts 304 when attaching the removable support plate 303 to the support base 302.

Figure 3C:
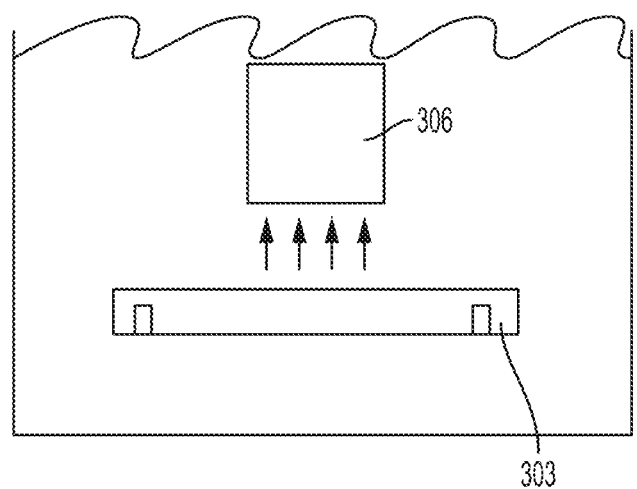

FIG. 3C shows a cross-sectional view of the object 306 and removable support plate 303 in a plating bath, according to an example embodiment. As shown in FIG. 3C, the object 306 and removable support plate 303 may be submerged in the plating bath to undergo an electrolysis. The release layer 305 is dissolved during this process such that the release layer 305 separates from the object 306 and removable support plate 303. A solvent such as, for example, an aqueous solvent may be used to dissolve the release layer 305. The aqueous solvent may be, for example, an aqueous ammonia.

In another embodiment, for example, the release layer 305 may be separated from the object 306 and removable support plate 303 by thermal processing. That is, by virtue of temperature, the object 306 may be removed from the removable support plate 303 by melting the release layer 305 away from the object 306 and removable support plate 303. The method according to an exemplary embodiment by may include melting at a temperature that is at or above a melting point of the release layer 305 and below a melting point of the object 306 and removable support plate 303. To separate the release layer 305 from the object 306 and the removable support plate 303, heating may occur at temperatures between 1,080° C. and 1,910° C. or 1,110° C. and 1,500° C. In the case of separation by heating, the residual release layer may be removed using electroplating. In addition, a new release layer may be formed over the support using electroplating. Other coating techniques such as chemical plating may be used to form the release layer as well.

Figure 4A:
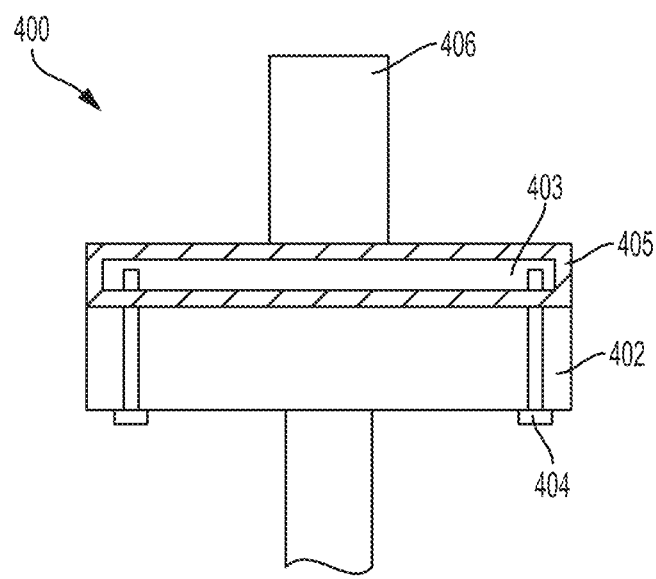
FIGS. 4A-C are diagrams illustrating a process of releasing an AM built object from a support plate, according to another embodiment of the present invention.

FIG. 4A shows a cross-sectional side view of the AM apparatus 400, according to another example embodiment of the present invention. As shown in FIG. 4A, the AM apparatus 400 includes a support base 402 to support an object 406 to be built thereon. The support base 402 may be controlled by a control unit (not shown) to adjust the support base 402 during the building process of the object 406. A removable support plate 403 may be provided to attach to an upper side of the support base 402 and can be adjusted together with the support base 402. The removable support plate 403 may be configured to have a width that corresponds to a width of the support base 402. That is, the removable support plate 403 may extend along the support base 402 such that the removable support plate 403 extends parallel to the upper side of the support base 402. The support base 402 may be configured with bolts 404 to attach a bottom side of the removable support plate 403 to the support base 402.

According to the example embodiment in FIG. 4A, the AM apparatus 400 may be configured with a release layer 405 positioned around an outer portion of the removable support plate 403 to cover the entire removable support plate 403 except for a portion of the removable support plate 403 configured to receive the bolts 404 attached to the bottom side thereof. The object 405 may be built on top of the release layer 405.

Figure 4B:
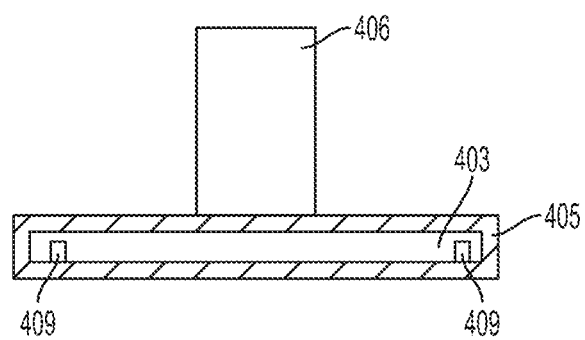

FIG. 4B shows a cross-sectional view of the release layer 405 and removable support plate 403, according to an example embodiment. As shown in FIG. 4B, the object 406 is positioned on the release layer 405 when the object 406 is undergoing the building process. The bottom side of the removable support plate 403 is illustrated with receiving portions 409 to receive the bolts 404 when attaching the removable support plate 403 to the support base 402.

Figure 4C:
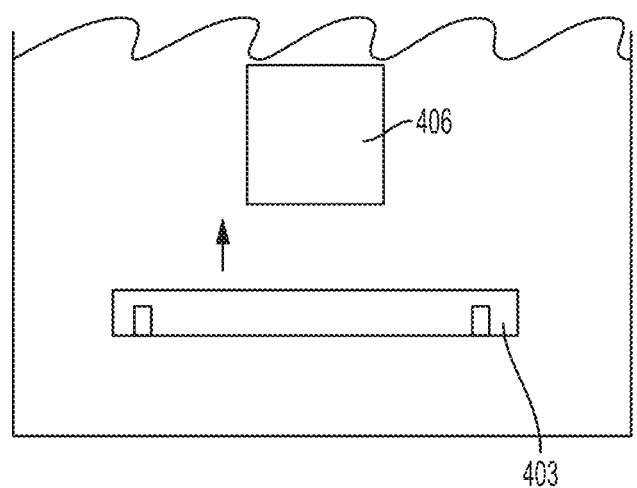

FIG. 4C shows a cross-sectional view of the object 406 and removable support plate 403 in a plating bath, according to an example embodiment. As mentioned above, the release layer 405 may be separated from the object 406 and removable support plate 403 when submerged in a plating bath through the process of electrolysis. Alternatively, as mentioned above, the release layer 405 may be separated from the object 406 and removable support plate 403 by thermal processing by virtue of temperature.

Figure 4D:
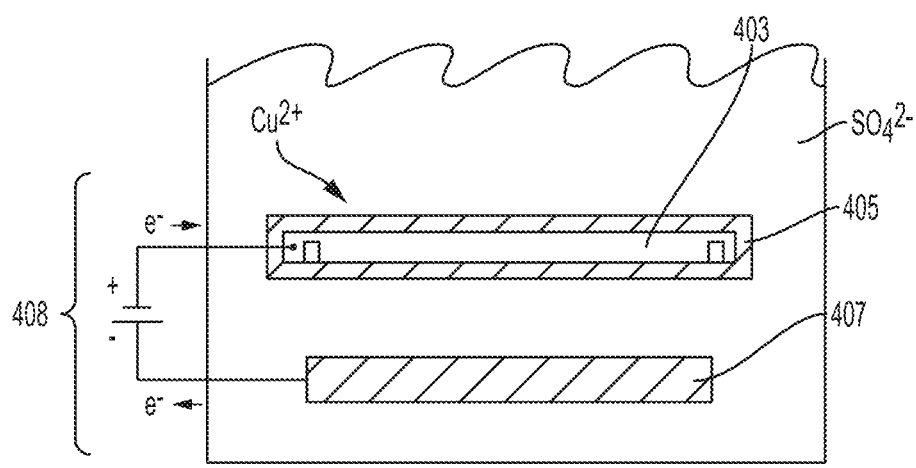
FIGS. 4D and 4E are diagrams illustrating a process of releasing an AM built object from a support plate, according to another embodiment of the present invention.
Figure 4E:
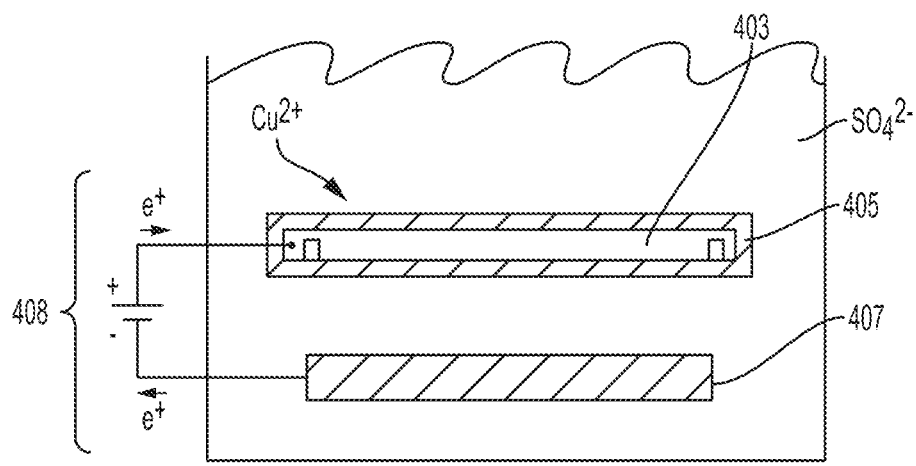

FIGS. 4D and 4E are diagrams illustrating a cross-sectional view of a plating bath process, according to another example embodiment of the present invention. The process of electroplating may be used to remove a release layer from a support plate when the release layer is placed in the plating bath. In an example embodiment as shown in FIG. 4D, the release layer 405 and the removable support plate 403 are placed in the bath. An electrode 407 is positioned under the removable support plate 403 having the release layer 405 covering the outer portion thereof, and extends parallel to the width of the removable support plate 403. A power source 408 is connected at one end to the removable support plate 403 and at another end to the electrode 407. The example embodiment in FIG. 4D illustrates an electroplating process by which a current $e^-$ flows from the electrode 407 to the removable support plate 403 to remove the release layer 405 from the removable support plate 403. Alternatively, the process of electroplating may be used to add a release layer to a support plate when the release layer is placed in the plating bath. The example embodiment in FIG. 4E illustrates an electroplating process by which a current $e^+$ flows from the electrode 407 to the removable support plate 403 to add a release layer (not shown) to the removable support plate 403.

In another exemplary embodiment, the present invention may be configured to create the object in the powder bed using binder jetting in accordance with suitable methods, materials, and/or apparatuses known in the art. For example, a mechanism for fusing powder or, alternatively, another material used to build the object (306, 406), is binder jetting which applies binder material to the powder to produce layers upon layers of bonded powder material. As with other additive powder bed methods described herein, the object formed by binder jetting may be released from the support plate or removable support plate using the release layer. Where a metal object is formed in a metal powder bed by binder jetting, a post heat treatment step may be applied to remove binder and consolidate the metal of the object. Such heat treatment step may take place in addition to or in conjunction with the separation of the object from the support by melting the release layer.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

What is claimed is:

1. A method for fabricating an object, comprising:
    (a) depositing a given layer of powder over a support plate in a powder bed, the support plate having a first release layer;
    (b) fusing the given layer of powder in the powder bed to form a given fused region;
    (c) depositing a subsequent layer of powder;
    (d) repeating steps (b) and (c) until the object is formed in the powder bed; and
    (e) separating the object from the support plate by melting or dissolving the first release layer,
        wherein separating the object from the support plate by melting the first release layer comprises removing a residual release layer using electroplating, and
        wherein separating the object from the support plate by dissolving the first release layer comprises submerging the object and the support plate in a plating bath to undergo electrolysis.

2. The method of claim 1, wherein step (e) includes melting at a temperature that is at or above a melting point of the first release layer, and below a melting point of the object.

3. The method of claim 1, wherein the first release layer is copper or a copper alloy and the object is cobalt-chrome or an alloy of cobalt-chrome.

4. The method of claim 1, wherein the step (e) includes heating at a temperature between 1,080° C. and 1,910° C.

5. The method of claim 4, wherein the step (e) includes heating at a temperature between 1,110° C. and 1,500° C.

6. The method of claim 1, wherein step (e) includes dissolving the first release layer in a solvent.

7. The method of claim 6, wherein dissolving the first release layer utilizes an aqueous ammonia.

8. The method of claim 1, wherein fusing the given layer of powder includes irradiation or binder jetting.

9. The method of claim 8, wherein the irradiation is digital light processing, laser, or electron beam irradiation.

10. The method of claim 9, wherein after step (e) a second release layer is provided using electroplating.

11. The method of claim 1, wherein after step (e) a step of grinding is carried out to remove any remaining first release layer on the object.

12. The method of claim 1, wherein the fused region is formed from a powder having a melting point higher than that of the first release layer.

* * * * *